Figure 1:
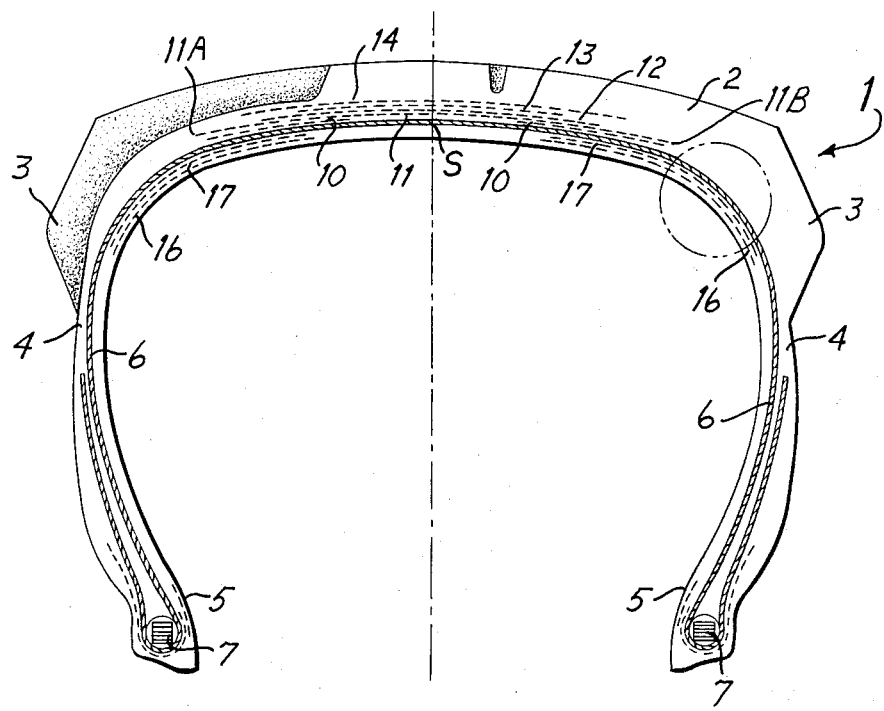

United States Patent [19]
Verdier

[11] 3,789,900
[45] Feb. 5, 1974

[54] PNEUMATIC TIRES

[75] Inventor: Henri Verdier, Beauregard-L Eveque, France

[73] Assignee: Compagnie Generale Des Establissements Michelin, raison sociale Michelin & Cie, Clermont-Ferrand, France

[22] Filed: June 9, 1972

[21] Appl. No.: 261,379

[30] Foreign Application Priority Data
June 15, 1971 France .................................. 7121773

[52] U.S. Cl. ............................. 152/356, 152/361 R
[51] Int. Cl. ............................ B60c 9/04, B60c 9/18
[58] Field of Search ... 152/350, 354, 355, 356, 357, 152/359, 361

[56] References Cited
UNITED STATES PATENTS
3,386,487   6/1968   Massoubre ........................... 152/361
3,703,203   11/1972  Simpson ............................... 152/354

FOREIGN PATENTS OR APPLICATIONS
391,489   9/1965   Switzerland ......................... 152/361

Primary Examiner—Gerald M. Forlenza
Assistant Examiner—Robert Saifer
Attorney, Agent, or Firm—Granville M. Brumbaugh et al.

[57] ABSTRACT

A tire of reduced weight and greater strength is obtained by restraining the radial carcass on the inside by means of a shoulder ply arranged on the inside of the carcass at each end of the crown reinforcement so as to impart a nearly rectangular meridian profile to the carcass.

8 Claims, 3 Drawing Figures

PATENTED FEB 5 1974

3,789,900

PNEUMATIC TIRES

The object of the present invention is improvements in radial-carcass pneumatic tires, said improvements relating more particularly to the structure of the junction of the crown of the tire with the sidewalls.

As is known, a radial carcass tire has a double reinforcement, namely a crown reinforcement which reinforces the tread and a carcass reinforcement which reinforces the sidewalls and connects them to the crown. The carcass reinforcement, which is flexible and deformable, is formed of wires or cords arranged in radial planes of the tire. The crown reinforcement, which is rigid and relatively nondeformable, is formed of a stack of cord plies, preferably of metal, arranged in two and preferably three different directions.

The connecting of reinforcements which are so dissimilar raises a difficult problem. The difficulty resides in the great difference in shape and deformability of their meridian profiles.

Under the action of the inflation pressure, the crown reinforcement has a tendency to assume a slightly curved, practically flat meridian profile. Moreover, this profile changes little when the meridian section which contains it comes into the area of contact of the tire with the road. Moreover, the angular arrangement of the cords of the crown reinforcement is selected in order to obtain a slightly curved meridian profile, so that the tread and the crown reinforcement travel on the ground with minimum distortion.

The carcass reinforcement is entirely different. Under the action of the inflation pressure, it has a tendency to assume a relatively curved meridian profile. Moreover, the meridian profile changes greatly when the section which contains it turns around the axis of rotation of the tire; it is, as a matter of fact, the carcass which undergoes the greatest deformation in that region of the tire which contacts the ground. Furthermore, the meridian profile of the carcass is subject to the greatest variations of curvature in the zone near the tread.

The solution adopted for connecting the crown reinforcement and the carcass reinforcement consists in providing between them a layer of rubber which is of small or zero thickness in the vicinity of the central plane of the tire progressively increasing in thickness towards the edges of the crown reinforcement. These wedges of rubber have the role of taking up the difference between the curvatures of the two reinforcements and of absorbing the changes in curvature of the carcass during travel. They form an elastic bond which permits the cooperation of two types of reinforcements which are fundamentally different and have different functions.

It will readily be understood that this arrangement is not without its drawbacks.

The first and principal drawback is that the tire has an excess thickness in the region of the shoulders and of the edges of the crown reinforcement and this in a zone which is stressed a good deal. As a matter of fact, to the extent that the difference in curvature which the crown reinforcement and carcass reinforcement naturally present is completely taken up, one is compelled to use thicker wedges of rubber, which favors an accumulation of heat. If the difference in curvature is not fully taken up, the rubber wedges are thinner but the amount of the stresses is greater.

This drawback is obviously greater in the case of tires employing a wide tread which fully covers the region of the shoulder, that is to say, the region of the junction of the crown with the sidewalls.

A second drawback is that the carcass reinforcement produces harmful stresses whenever its molded profile does not correspond strictly to its equilibrium profile. In particular, the outer covering of the tire may be stretched, which favors cracks and tears in the tread grooves in the region of the shoulder. Similarly, the inner covering of the tire may at times be sheared by the cords of the carcass.

The present invention is directed at alleviating these drawbacks, doing this by correcting the insufficiently curved meridian profile of the carcass so as to bring the meridian profiles of the carcass reinforcement and of the crown reinforcement close to each other and facilitate the connecting of them.

The pneumatic tire in accordance with the invention comprising a continuous carcass formed of radial wires or cords and a crown plied reinforcement which reinforces the tread, has a slightly curved meridian profile and restrains the carcass on the ouside, is characterized by the fact that the carcass is restrained on the inside by at least one shoulder ply of elastic wires or cords forming an angle of at most 30° with respect to the radial wires or cords of the carcass, said shoulder ply being separately arranged on the inside of the carcass at each end of the crown plied reinforcement.

By elastic wires or cords there is understood a wire or cord having an elongation at rupture of more than 6 percent.

In accordance with various preferred embodiments:

a. the carcass is restrained on the inside by two shoulder plies of elastic wires or cords intersecting from one ply to the other, b. the elastic wires or cords of the shoulder ply are inclined by an angle of 10° to 20° to the radial wires or cords of the carcass, c. the elastic wires or cords of the shoulder ply are arranged symmetrically with respect to the carcass wires or cords, d. the shoulder plies which restrain the carcass on the inside extend substantially over the same width on either side of each edge of the crown piled reinforcement, the difference in width not exceeding 20 percent, e. the total width of each shoulder ply which restrains the carcass on the inside is substantially equal to half the width of the widest crown ply, the difference not exceeding 20 percent, f. the elastic wires or cords of the shoulder ply are made of synthetic fibers, for instance, polyamide fibers.

It is essential in accordance with the invention that the carcass be reinforced and restrained on the inner side. It is a question of raising the profile of the carcass in the direction of the crown reinforcement by preventing the displacement of said profile towards the inside of the tire. The carcass is thus sandwiched between the crown reinforcement and the additional reinforcement provided in accordance with the invention.

It is essential that the additional reinforcement extend at each edge of the crown reinforcement. It is a question, as a matter of fact, of not only raising the meridian profile of the carcass in the direction of the tread, but furthermore of widening it in the direction towards the outside of the sidewalls.

It is finally essential to use elastic wires or cords which are slightly inclined with respect to the radial wires or cords of the carcass in order not to reduce the flexibility of the sidewalls in excessive and undesirable fashion. Moreover, elastic wires or cords which are excessively inclined with respect to the radial wires or cords of the carcass would make the shaping of the carcass difficult.

The arrangements described have the effect of raising the meridian profile of the crown of the carcass. This profile is more "rectangular" than in the absence of internal reinforcement, without the profile of the bottom zone of the carcass being substantially changed. Moreover, the region of the sidewalls of maximum width is brought close to the crown and the tension of the carcass wires is accordingly decreased.

The decrease in the disparity of the meridian profiles of the carcass and the crown reinforcement has the consequence of improving the coherence between the two reinforcements and reducing the thickness of the wedges of rubber forming the elastic connection between them. Not only is an appreciable reduction in weight obtained, but one also gains in strength. Subsidiarily, the auxiliary reinforcement which restrains the carcass on the inside reduces the stretching of the outer covering of the shoulder and prevents the shearing of the inner covering by the cords of the carcass.

Figure 3:
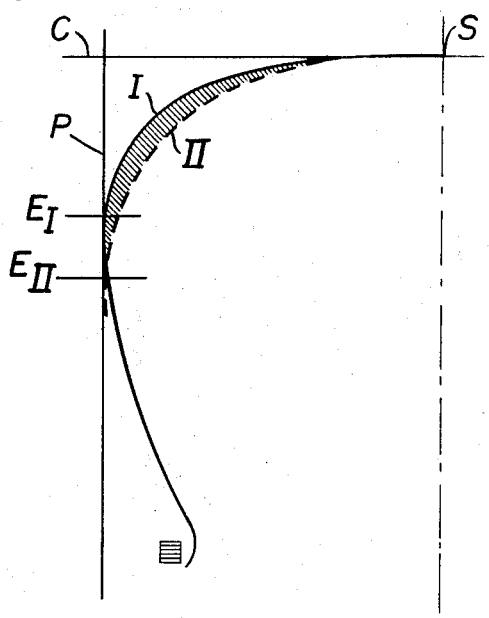
Figure 2:
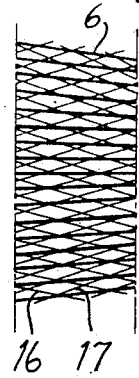

The invention will be clearly understood from a representative example illustrated in the accompanying drawings in which:

FIG. 1 is a radial or transverse cross section through a tire in accordance with the invention, FIG. 2 shows, seen in enlarged plan view, the portion of the tire reinforcement enclosed by a circle in FIG. 1, and FIG. 3 shows in solid line the meridian profile of the carcass of the tire of FIG. 1 and in dashed line the meridian profile of a carcass of a tire which is not restrained on the inside.

FIG. 1 shows in radial or transverse cross section a tire 1 in accordance with the invention of size 33.5—33. This therefore is a tire of very large size for construction equipment, weighing about 900 kg. Of course, the invention is not limited either to such size or to such type of tire.

This tire has a very wide tread 2 in accordance with U.S Pat. No. 3,457,981, having lateral protuberances 3, and sidewalls 4 terminating in beads 5.

Its reinforcement is composed first of all of a continuous carcass reinforcement 6 composed of radial metal cords anchored around two bead wires 7 and extending up again in the sidewall substantially to the midheight of the sidewall 4. Secondly, it comprises a crown plied reinforcement containing in succession:

two narrow plies 10 of metal cords inclined by an angle of 65° to the left with respect to the circumferential direction.

a narrower ply 12 of metal cords inclined by an angle of 24° towards the right, two plies 13 and 14 of elastic metal cables inclined by an angle of 24° to the left and to the right respectively.

In accordance with the invention, the carcass 6 is reinforced by two shoulder plies 16 and 17 of polyamide cords spanning each of the edges 11A and 11B of the ply 11 and extending over substantially equal distances. The shoulder plies 16 and 17 have a width which corresponds approximately to half the width of the widest crown ply 11. These shoulder plies 16 and 17 are placed in accordance with the invention below or inside the carcass 6. The polyamide cords of which they are composed are formed of two strands of a denier of 1880 decitex. They stretch 8 percent for a load corresponding to one-quarter of the rupture load. They are arranged in a density of 120 cords per decimeter of width of the ply.

The cords of the shoulder plies 16 and 17, as can be noted from FIG. 2, are inclined by an angle of about 15° to the radial cords of the carcass 6, that is to say, by an angle of about 75° to the circumferential direction.

FIG. 3 shows superimposed the meridian profile I of the carcass of the tire of FIG. 1 and meridian profile II of the carcass of a tire which is identical except that it does not have the shoulder plies 16 and 17.

As can be seen, the meridian profile I of a carcass in accordance with the invention which is restrained both on the outside and on the inside is much more "rectangular," that is to say closer both to the cylinder C circumscribed around the carcass along the median line S of the crown and the planes P perpendicular to the axis of the tire and tangent to the sidewalls. Moreover, the meridian profile I is tangent to the plane P along a parallel circle of tangency $E_I$ of larger diameter than the parallel circle of tangency $E_{II}$ of the conventional meridian profile II.

FIG. 3 shows the advantage of the invention. As a matter of fact, by bringing the meridian profile of the carcass towards the outer profile of the tire, one saves an appreciable amount of rubber (hatched zone) corresponding to the difference in the surfaces bounded by the profiles I and II. In the case of a tire of the size 33.5-33, the saving is 72 kg of rubber, namely, about 8 percent of the weight. Moreover, the thickness of the tire is decreased in a region where it is generally excessive and where it produces undesirable heating upon travel. This last-mentioned advantage is particularly substantial in the case of a tire having a wide tread which is continued into the sidewalls, as in the case of FIG. 1.

As can be seen, the shoulder plies 16 and 17 of elastic cords substantially and unexpectedly modify the geometry of the tire and in a manner which is both simple and effective, correct the tendency of a radial carcass to move away from a substantially cylindrical crown reinforcement. If one takes the precaution of internally restraining the carcass, without making it rigid, by using elastic cords of only slight inclination to the cords of the carcass, the flexibility of the tire is changed very little.

It goes without saying that without going beyond the scope of the invention, various changes could be made in the example described. The essential thing is to restrain the carcass on the inside, at each edge of the crown reinforcement, without thereby removing its flexibility.

What is claimed is:

1. A tire comprising a continuous carcass formed of radial wires or cords and a crown plied reinforcement which reinforces the tread, has a slightly curved meridian profile and restrains the carcass on the outside, characterized by the fact that the carcass is restrained on the inside by at least one shoulder ply of elastic wires or cords forming an angle of at most 30° with respect to the radial wires or cords of the carcass, said shoulder ply being separately arranged on the inside of the carcass at each end of the crown plied reinforcement, whereby the meridian profile of the carcass is raised in the direction of the crown plied reinforcement.

2. The tire as defined by claim 1 wherein the carcass is restrained on the inside by two shoulder plies of elastic wires or cords having opposite angularity.

3. The tire as defined by claim 1 wherein the elastic wires or cords of said shoulder ply which restrains the carcass on the inside form an angle of between 10° and 20° with respect to the radial wires or cords of the carcass.

4. The tire as defined by claim 1 wherein the said shoulder ply of elastic wires or cords extends substantially over the same width on either side of each edge of the crown plied reinforcement.

5. The tire as defined by claim 1 wherein the said shoulder ply of elastic wires or cords has a width substantially equal to one-half of the width of the widest crown ply.

6. The tire as defined by claim 1 wherein the elastic wires or cords of the shoulder ply consist of synthetic fibers.

7. The tire as defined by claim 1 wherein the carcass has a substantially rectangular meridian profile comprising a central portion covered by the crown reinforcement and spaced only slightly from it and two lateral portions substantially parallel to the median plane and also only slightly curved, the central portion and the lateral portions being connected by strongly curved connections of small developed length.

8. The tire as defined by claim 1 wherein the tread has a width substantially equal to that of the carcass and a distance from the carcass substantially constant at all points of its outer surface.

* * * * *

PO-1050
(5/69)

UNITED STATES PATENT OFFICE
CERTIFICATE OF CORRECTION

Patent No. 3,789,900        Dated February 5, 1974

Inventor(s) Henri Verdier

It is certified that error appears in the above-identified patent and that said Letters Patent are hereby corrected as shown below:

On face of patent, first column, after "Inventor:",
    "Henri Verdier, Beauregard-L
      Eveque, France"
should read
    -- Henri Verdier, Beauregard-
      L'Eveque, France --.
Column 2, line 46, "piled" should read -- plied --.
Column 3, between lines 57 and 58, the following paragraph should be inserted: -- - a wide ply 11 of metal cords inclined by an angle of 24° towards the left at the middle of the ply, --.

Signed and sealed this 17th day of September 1974.

(SEAL)
Attest:

McCOY M. GIBSON JR.
Attesting Officer

C. MARSHALL DANN
Commissioner of Patents